March 1, 1932. E. T. LORIG 1,847,882
FRICTION COUPLING
Filed Sept. 30, 1929
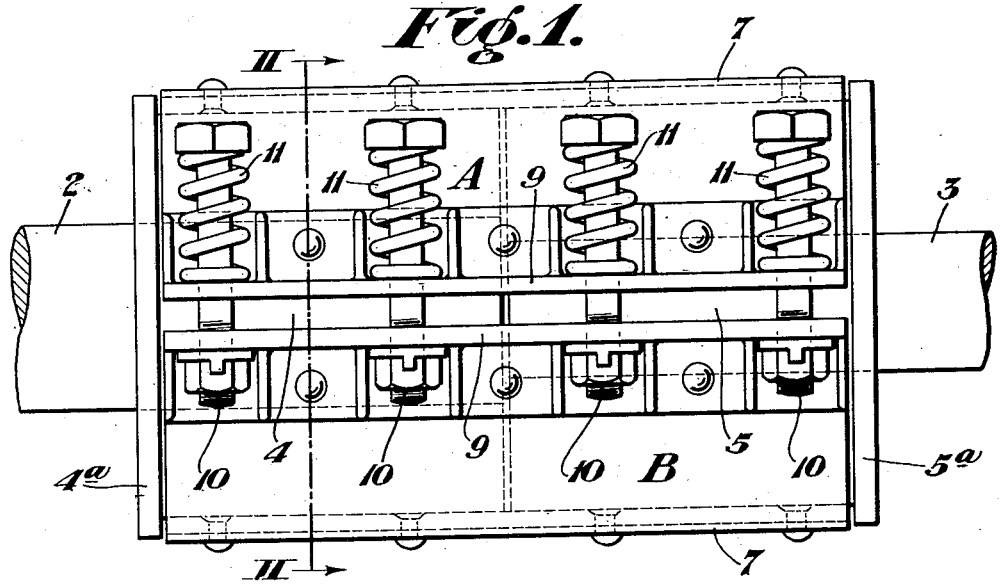
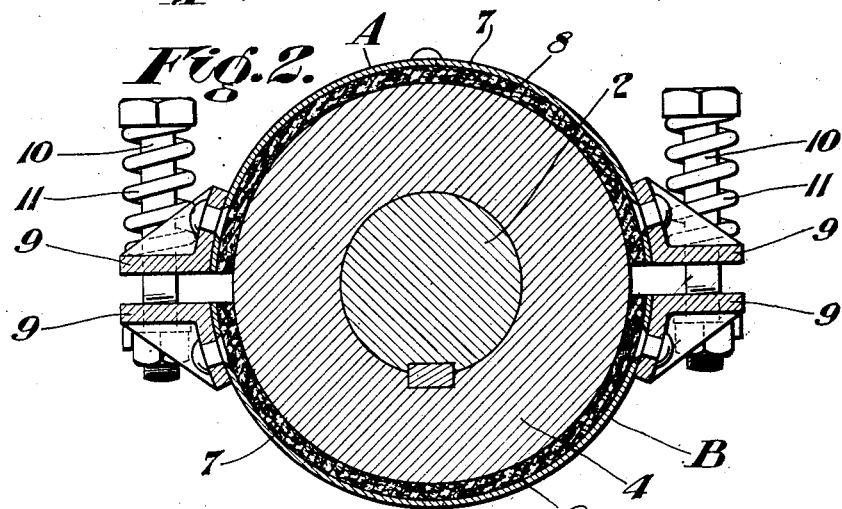
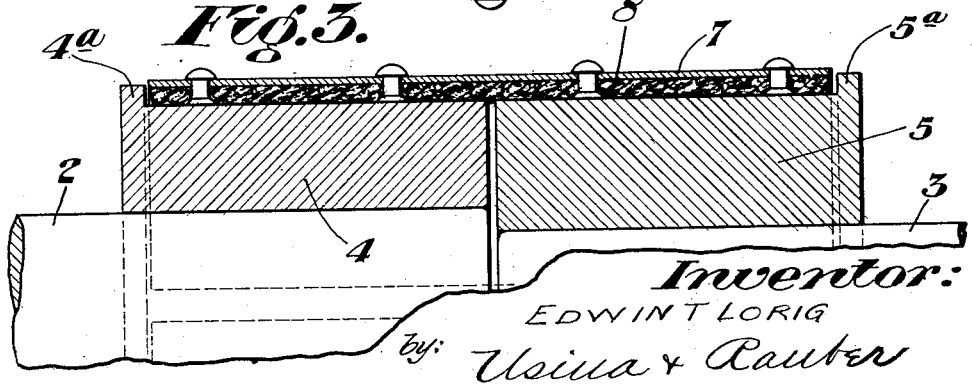
Inventor:
EDWIN T LORIG
by: Usina & Rauber
his Attorneys Patented Mar. 1, 1932

1,847,882

UNITED STATES PATENT OFFICE

EDWIN T. LORIG, OF GARY, INDIANA

FRICTION COUPLING

Application filed September 30, 1929. Serial No. 396,377.

This invention relates to couplings and, while not limited thereto, relates more particularly to a flexible friction type coupling and has for its object the provision of such a coupling which will prevent overload from being communicated to the driving member, and will also prevent damage to both driving and driven mechanism due to abnormal load.

Another object is to provide a coupling which will not be damaged when caused to slip due to overload.

A further object is to provide a coupling composed of few parts which will require no oiling, greasing or other maintenance and which will have long life due to the absence of moving parts.

In the drawings:

Figure 1 is a side elevation of a coupling constructed in accordance with this invention.

Figure 2 is a sectional end elevation taken on the line II—II of Figure 1.

Figure 3 is a side elevation of the coupling of Figures 1 and 2.

Referring more particularly to the drawings, the numeral 2 designates a driving-shaft which may receive its power from a motor or any other prime mover (not shown) and the numeral 3 designates a driven shaft of any apparatus which it is desired to drive by coupling to the shaft 2.

The shaft 2 is provided with a drum 4 which is keyed thereto and rotates therewith, and the shaft 3 is provided with a drum 5 which is keyed thereto and adapted to rotate therewith.

The drums 4 and 5 are adapted to be brought into alinement and have their outer ends provided with flanges 4ª and 5ª, respectively.

A two-part coupling band is mounted around the drums 4 and 5 and is composed of an outer resilient and flexible body or shell 7 and an inner lining 8 of fabric preferably, such as is usually applied to brake bands of automotive vehicles and the like. The band is divided along its longitudinal center line to form upper and lower parts A and B and each part has the longitudinal edges provided with outwardly extending flanges 9. The flanges 9 may be formed by attaching angle-shaped bars to the body or shell 7 or may be formed by turning the body, as desired.

The flanges 9 are apertured at spaced intervals to receive bolts 10 and springs 11 are mounted between the heads of the bolts 10 and the flange on the upper part A of the coupling so as to provide adjustable tensioning means for forcing the band parts A and B toward each other and into frictional engagement with the drums 4 and 5.

It will be understood that, if desired, the springs 11 may be omitted and the bolts alone be used for forcing or drawing the band parts toward each other and into frictional engagement with the drums. When the springs 11 are omitted it will be necessary to occasionally tighten the bolts 10 while when the springs 11 are used they will automatically take up wear on the band lining 8.

In operation the driving force from the driving drum 4 to the driven drum 5 will be transmitted entirely through the coupling band and since there are no moving parts or complicated mechanism there is no danger of the coupling failing. In case of slippage under normal loads it is only necessary to slightly tighten the bolts 10 to increase the frictional engagement of the band on the drums.

While I have shown and described a certain specific embodiment of my invention it will be understood that I do not wish to be limited thereto since various modifications may be made without departing from the scope of my invention, as defined in the appended claim.

I claim:

A flexible friction drive-coupling comprising in combination a driving member, a driven member and a coupling band frictionally engaging said members and conveying the driving force from one member to the other, said band comprising an outer resilient and flexible metal shell and an inner friction lining, said band being divided along its longitudinal center line at diametrically opposite points to form two semi-circular parts, outwardly extending rigid flanges along each longitudinal edge of said parts, said flanges being apertured to receive bolts for drawing the parts of said band toward each other and into frictional engagement with said members, springs mounted between the heads of said bolts and the flanges on one of the parts of said coupling and forming adjustable tensioning means for forcing the band parts toward each other and into frictional engagement with the driving and driven members, and a flexible friction fabric lining on the inner surface of each of said band parts.

In testimony whereof, I have hereunto set my hand.

EDWIN T. LORIG.